(12) United States Patent
Edwards et al.

(10) Patent No.: US 6,307,199 B1
(45) Date of Patent: Oct. 23, 2001

(54) COMPENSATION OF ERRORS IN LOGGING-WHILE-DRILLING DENSITY MEASUREMENTS

(75) Inventors: John E. Edwards, Sugar Land; Robert A. Adolph, Houston; W. Robert Sloan, Missouri City, all of TX (US)

(73) Assignee: Schlumberger Technology Corporation

(*) Notice: Subject to any disclaimer, the term of this patent is extended or adjusted under 35 U.S.C. 154(b) by 0 days.

(21) Appl. No.: 09/310,893

(22) Filed: May 12, 1999

(51) Int. Cl.$^7$ ..................................... G01V 1/00
(52) U.S. Cl. ................ 250/269.3; 250/254; 250/262
(58) Field of Search ............................. 250/269.3, 254, 250/262, 264

(56) References Cited

U.S. PATENT DOCUMENTS

| Re. 34,265 | * | 5/1993 | Foster et al. ........................... 356/28 |
| 4,030,064 | * | 6/1977 | Elliott ................................. 340/15.5 |
| 5,091,644 | | 2/1992 | Minette . |
| 5,299,128 | * | 3/1994 | Antoine et al. ...................... 364/422 |
| 5,397,893 | | 3/1995 | Minette . |
| 5,473,158 | | 12/1995 | Holenka et al. . |
| 5,737,277 | * | 4/1998 | Priest ................................... 367/27 |
| 5,899,958 | * | 5/1999 | Dowell et al. ........................... 702/6 |
| 6,006,844 | * | 12/1999 | Van Puymbroeck et al. ......... 175/50 |
| 6,041,860 | * | 3/2000 | Nazzal et al. .................... 166/250.01 |
| 6,173,793 | * | 1/2001 | Thompson et al. ..................... 175/45 |

FOREIGN PATENT DOCUMENTS 0 663 511 A2    7/1995    (EP) .

OTHER PUBLICATIONS

Faivre, Ollivier and Gerar Catala, "Dip Estimation Fro Asimuthal Laterolog Tools", SPWLA 36$^{th}$ Annual Logging Symposium, Jun. 26–29, 1995, Paper C.

* cited by examiner

*Primary Examiner*—Constantine Hannaher
*Assistant Examiner*—Otilia Gabor
(74) *Attorney, Agent, or Firm*—Brigitte Jeffery; Victor Segura; Jennie Salazar

(57) ABSTRACT

A system is disclosed for compensating well logs for adverse effects of the borehole and near borehole formation effects. The system is configured primarily for processing logging-while-drilling (LWD) density measurements, and includes means for generating a one-dimensional density log which is corrected for adverse effects of logging tool standoff and "dipping" beds penetrated by the borehole. The system is, however, applicable to any type of LWD or other type of logging system which requires borehole corrections, and which responds to variations in formation properties in a plane perpendicular to the borehole. The system can also be modified to include LWD apparatus using sensors that require no borehole corrections, and only require corrections for dipping beds. The system is ideally suited for logging equipment using two sensors, but can be modified for use with single sensor systems or systems using more than two sensors.

41 Claims, 4 Drawing Sheets

COMPENSATION OF ERRORS IN LOGGING-WHILE-DRILLING DENSITY MEASUREMENTS

BACKGROUND OF THE INVENTION

1. Field of the Invention

This invention relates to the field of logging-while-drilling (LWD) well boreholes, and more particularly relates to compensation for effects in LWD formation density measurements.

2. Background of the Related Art

The density of formations penetrated by a well borehole is used in many aspects of the petroleum industry. More specifically, formation density is combined with measurements of other formation properties to determine gas saturation, lithology, porosity, the density of hydrocarbons within the formation pore space, properties of shaly sands, and other parameters of interest.

Methods and apparatus for determining formation density, comprising an isotopic gamma ray source and two gamma ray detectors, were introduced in the 1960's by J. S. Wahl et al (J. S. Wahl. J. Tittman and C. W. Johnstone, "The Dual Spacing Formation Density Log", Journal of Petroleum Technology, December, 1964). These basic concepts are still used today, and are often referred to as dual spaced density logs or gamma-gamma density logs. The apparatus is configured as a logging tool (sonde) for conveying, preferably with a multiconductor cable, along a borehole thereby "logging" formation density as a function of depth. The source and two detectors are typically mounted in an articulating pad device with a backup arm. The backup arm applies force to the articulating pad to maximize pad contact with the wall of the borehole. The sonde responds primarily to radiation which is emitted by the source and scattered by the formation into the detectors. The scatter reaction is primarily Compton scattering, and the number of Compton scattering collisions within the formation can be related to electron density of materials within the formation. Through sonde calibration means, a measure of electron density of the formation can be related to true bulk density of the formation.

Since the dual spaced density measurement technique is based upon a nuclear process, statistical error is associated with the measurement. There is also non-statistical error in the measurement. Although the articulating pad and backup arm tend to position the pad against the borehole wall, the largest source of non-statistical error is generally still associated with the position of the tool within the well borehole, and is generally referred to as standoff error. The responses of the two detectors are combined in prior art dual spaced density systems using well known algorithms to minimize standoff error, but unfortunately these algorithms do not completely eliminate this source of error.

The dual spaced density system is now available as an LWD system. As in the wireline version of the system, the dominant non-statistical error that arises in LWD formation density measurements results from tool standoff. The standoff problem is far more complex in LWD systems than in wireline systems. The LWD tool must rotate with the drill string, therefore, the articulating pad and backup arm used in the wireline embodiment is impractical in the LWD embodiment. More specifically, standoff complexities arise from LWD tool non-concentric rotation to the borehole, linear radial tool motion relative to the borehole, and variations in the formation density surrounding the borehole in a plane perpendicular to the tool's rotation.

One approach used to resolve the LWD density measurement standoff problem is set forth in U.S. Pat. No. 5,473,158 to Jacques M. Holenka et al. Counts from the two detectors are segregated into angular (azimuthal) segments as the tool rotates in the borehole. If it is assumed that there is no radial tool motion within the borehole, tool standoff would be nearly constant over small angular segments. Count rates from the detectors, recorded in each angular segment, can then be combined using a known correction algorithm (spine and rib) to obtain a standoff corrected density measurement for each segment. The spine and rib method, described in Wahl, provides the basis for a suitable correction algorithm. Unfortunately, the radial position of the tool can vary significantly during multiple rotations through each specific segment thereby introducing standoff error if detector responses are depth shifted.

U.S. Pat. No. 5,091,644 to Daniel C. Minette discloses a error minimization technique for combining azimuthally segmented density measurements to arrive at a density value best representing the collection of segmented measurements at a given depth within the borehole. This technique assumes that formation density is constant in the plane perpendicular to the tool's rotation. This assumption is invalid when the borehole penetrates relatively thinly laminated, dipping beds or when the borehole is deviated from the vertical through thinly laminated beds. Azimuthal averaging of data measured in dipping beds will yield erroneous density values and also show bed thicknesses on a one-dimensional display which do not represent true bed thickness. Furthermore, Minette does not account for variations in the radial position of the tool when depth shifting detector responses to compute a borehole compensated density value.

OBJECTS OF THE INVENTION

An object of this invention is to provide formation density measurements corrected for standoff resulting from non-concentric rotation of a LWD density tool in a well borehole.

Another object of this invention is to provide a density measurement corrected for standoff resulting from linear radial motion of the LWD density tool in the borehole.

Yet another object of this invention is to provide a LWD density measurement corrected for variations in the formation density surrounding the borehole in a plane perpendicular to the tool's rotation.

Another object of this invention is to provide a one-dimensional compensated density log, referenced to a vector such as the bottom side of the borehole, which reflects true thickness of dipping beds penetrated by the borehole while maximizing the statistical accuracy of the measurement.

Still another object of the invention is to provide two or more one-dimensional logs, referenced to directional vectors such as the top and bottom sides of the borehole, and corrected for adverse effects of non-concentric rotation of the LWD density tool, linear radial motion of the tool, and effects of dipping beds.

Yet another object of the present invention is to provide methods for correcting the response of several LWD systems and for presenting one-dimensional logs of formation properties corrected for adverse effects of borehole conditions such as (1) borehole fluid and standoff effects, (2) near borehole formation perturbations such as borehole fluid invasion, and (3) the effects of variations in formation properties in a plane perpendicular to the axis of the borehole.

SUMMARY OF THE INVENTION

The techniques set forth in the following disclosure are directed primarily toward LWD density logging and means for generating a one-dimensional density log corrected for adverse effects of standoff and dipping beds penetrated by the borehole.

In the subject invention, each tool rotation is divided into small angular segments. Count rates recorded from each of the two detectors are recorded for each segment. The detectors are referred to as the long spaced or short spaced detector in order to specify a detector's axial spacing from the source.

Long and short spaced detector count rates for each segment, recorded during the same time interval, are processed to correct for time correlated standoff. The long and short spaced detectors may be positioned opposite formations with differing densities. The spine and rib method is preferably used to correct measured bulk density for each segment for time related standoff. A corrected density value and a corresponding time correlated density correction are recorded for each segment.

After obtaining a correction for time correlated standoff, detector responses in each segment are depth shifted such that depth shifted count rates represent detector responses in the same formation strata for a given segment. Depth shifted data are again processed, and depth based standoff density corrections for the long and short spaced detectors are again computed, preferably using the spine and rib technique. Depth corrected bulk density, as well as the depth correlated density correction, are recorded as a function of reference depth to which long spaced and short spaced count rate data are shifted. Depth shifted count rates for given segments are not recorded during the same time interval.

Data corrected for time based and depth based standoff are next combined to obtain an optimized density correction. In a preferred embodiment, the time based and depth based corrections for the long spaced detector are compared for each segment. The smaller of these two corrections is then added algebraically to the corresponding formation bulk density value computed from the long spaced detector. Other algorithms may be employed to combine time based and depth based corrections to obtain bulk density corrected for standoff involving a third correction term. This type of correction algorithm brings into the decision making the time based error term associated with the short spaced detector response as well as the long spaced detector response. Two time derived correction terms are then used to estimate standoff of each detector. This results in a standoff estimate to be used in computations using depth shifted detector count rate measurements. Two cases are then considered and used to obtain a formation bulk density value for each segment.

In the subject invention, segmented rotational measurements are combined with orthogonal depth measurements as the tool is conveyed within the borehole to generate a two-dimensional cylindrical image or "map" of the borehole density. Two-dimensional maps of substantially constant density are determined, as a function of depth, from standoff corrected density measurements for each segment. In some cases several regions may be required, e.g. depth intervals straddling a formation bed boundary. Regions of constant density are identified from the two-dimensional map, and these regions of constant density are averaged to form a one-dimensional bulk density measurement with respect to a reference depth and with respect to an azimuthal reference vector in the borehole, such as the top or the bottom of the borehole. Over this region or regions, an optimized measured density is computed using error minimization techniques. The error minimization is over a two-dimensional region, defined in borehole angle and depth, and not a simple one-dimensional region in depth, such as an average of azimuthal segment computations at a single tool depth. Stated another way, averaged regions of constant density in dipping beds are not at the same depth within the borehole for a given azimuth. Since data from all segments of constant density are azimuthally averaged, statistical precision of the measurement is maximized.

Accuracy of the density measurements is maximized, and true bed thicknesses are obtained, in that regions of differing density are not "mixed" in the azimuthal averaging process. While being able to select a region bounded by geological dip is essential to accurate processing of density measurements, it is also required to be able to reference the resulting one-dimensional computed bulk density to a fixed borehole orientation or reference vector relative to the local gravity vector. The subject invention yields a one-dimensional formation bulk density measurement which is compensated for both time correlated and depth correlated standoff and which is referenced to a known borehole orientation as a function of depth. One-dimensional logs are preferred in that most log interpretation software is designed for one-dimensional rather than two-dimensional logs.

In an alternate embodiment of the invention, to enable accurate comparison of wireline density logs and the LWD density log, it is preferred to set the reference vector at the low side or bottom of the borehole. If the methodology is used with other types of LWD systems, such as resistivity devices with multiple depths of investigation, it may be desirable to generate two or more one-dimensional logs with one referenced to the top of the borehole, the second referenced to the bottom of the borehole, and possibly others referenced to the sides of the borehole. Multiple logs of this type can be used in borehole fluid invasion studies in deviated wells.

BRIEF DESCRIPTION OF THE DRAWINGS

The advantages of the present invention will become apparent from the following description of the accompanying drawings. It is to be understood that the drawings are to be used for the purpose of illustration only, and not as a definition of the invention.

In the drawings.

DETAILED DESCRIPTION OF THE PREFERRED EMBODIMENTS

The disclosure of the preferred embodiments is divided into five sections. The first section discloses the preferred apparatus of the invention. The second section presents mathematical formalism and nomenclature used in the detailed disclosure of the invention embodied as a LWD density system. The third section discloses methods for correcting measured data for time and depth correlated standoff. The fourth section discloses methods for generating the desired one-dimensional log from azimuthal averages of measurements over regions of constant density. The fifth section summarizes data processing steps used in the invention.

Apparatus

Figure 1:
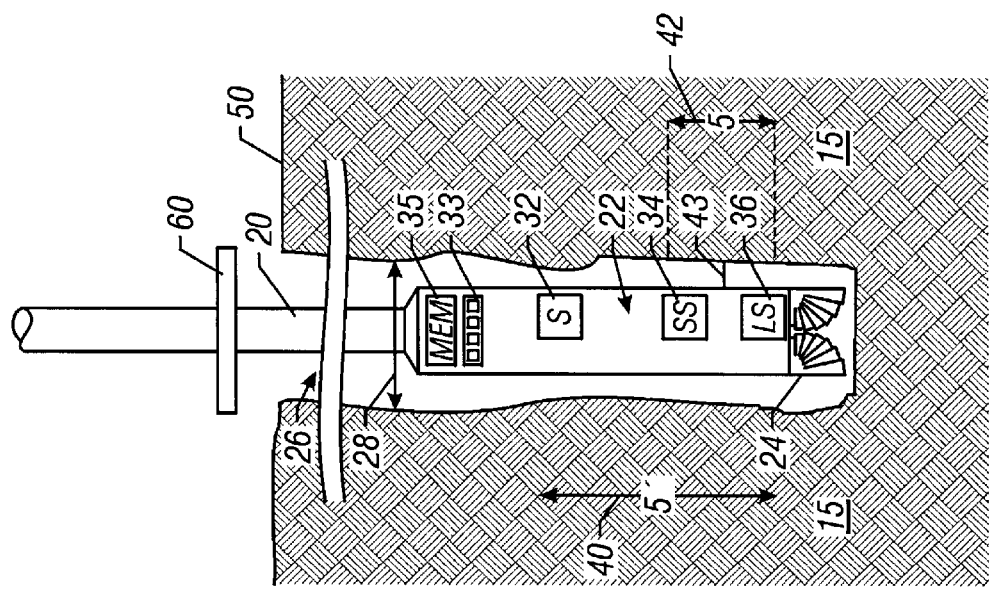
FIG. 1 is an illustration of the apparatus of the invention embodied as a dual detector gamma-gamma density LWD system.

FIG. 1 illustrates a dual detector gamma-gamma density device embodied as a logging-while-drilling (LWD) tool 22 that comprises a source 32 of gamma radiation, a short spaced gamma ray detector 34, and a long spaced gamma ray detector 36 positioned within the wall of a drill collar. The LWD tool 22 is suspended by means of a drill string 20 within a borehole 26 which penetrates an earth formation 15. The upper end of the drill string 20 is suspended at the surface of the earth 50 preferably from conventional rotary drilling draw works (not shown). The LWD tool 22 is conveyed along the borehole 26 by raising and lowering the drill string 20 using the draw works. A drill bit 24 is affixed to the lower end of the LWD tool 22. The drill string 20 is rotated by means of a kelly and rotary table 60 thereby rotating the LWD tool 22 and drill bit 24, and thereby extending the borehole 26 downwardly as a result of the cutting action of the drill bit 24. A preferably conventional drilling fluid system (not shown) is employed to remove cuttings formed by the rotating drill bit 24, to lubricate and cool the drill string and drill bit, and to maintain hydrostatic pressure within the borehole 26.

Attention is now directed to elements within the LWD tool 22 as shown in FIG. 1. The gamma ray source 32 is preferably an isotopic source such as $^{137}Cs$ or $^{60}Co$. Alternately, other sources of nuclear radiation which yield gamma radiation, such as an accelerator, can be used. Each of the short and long spaced gamma ray detectors 34 and 36 preferably comprises a scintillation crystal such as NaI(Tl), GSO or BGO optically coupled to a photomultiplier tube. The short spaced detector 34 is axially spaced a distance 42 from the gamma ray source 32, and the long spaced detector 36 is axially spaced a distance 40 from the gamma ray source 32. The gamma ray source 32, short spaced detector 34 and long spaced detector 36 are pressure sealed, preferably within the wall of the tool 22, thereby isolating these elements from the borehole environment, and also allowing for a preferably axial channel within the tool 22 through which the drilling fluid flows. The drilling fluid exits at the drill bit 24 in a manner well known to those skilled in the drilling art.

The relative positions of the short spaced detector 34 and the long spaced detector 36 can be varied with respect to the gamma ray source 32. Referring to FIG. 1, the short spaced and long spaced detectors can both be positioned above the gamma ray source at preferably axial spacings 42 and 40, respectively. Alternately, either the short spaced or the long spaced detector can be positioned above the gamma ray source, and the other detector can be positioned below the gamma ray source. Power supplies (not shown), and control and data conditioning circuitry (not shown) for the detectors 34 and 36 are contained preferably within the LWD tool 22. Measured counting rates from the short spaced detector 34 and long spaced detector 36 are preferably stored in a memory means 35 for subsequent processing in a central processing unit (CPU) 33. Processed results are preferably telemetered to the surface of the earth 50 by means of a mud pulse telemetry system (not shown) or other suitable telemetry system known in the LWD and MWD art. Alternately, the count rate data and processed data can be processed in the CPU 33 and stored within a memory means 35 for subsequent retrieval when the LWD tool 22 is returned to the surface of the earth.

Mathematical Formalism and Nomenclature

As mentioned previously, it is known in the art that gamma-gamma density measurements are adversely affected by tool standoff. This disclosure addresses the LWD density standoff correction using methodology comprising two contributing components: depth correlated standoff and time correlated standoff.

In disclosing the techniques of the invention, the following nomenclature and formalism will be used:

$C_{SS,i,d}$=count rate recorded by the short spaced detector in azimuthal segment i and at depth d;

$C_{LS,i,d}$=count rate recorded by the long spaced detector in azimuthal segment i and at depth d;

$C_{SS,i,t}$=count rate recorded by the short spaced detector in azimuthal segment i and at time t; and $C_{LS,i,t}$=count rate recorded by the long spaced detector in azimuthal segment i and at time t.

The spine and rib method for obtaining a standoff corrected density measurement from the above defined long and short spaced detector count rates measured at a tool reference point at a depth Z in the borehole yields:

$\rho_{i,d,Z}$=density corrected for depth correlated standoff for segment i at reference depth Z using the spine and rib algorithm;

$\Delta\rho_{i,d,Z}$=the density correction for depth correlated standoff for segment i at reference depth Z using the spine and rib algorithm;

$\rho_{i,t,Z}$=density corrected for time correlated standoff for segment i at reference depth Z using the spine and rib algorithm;

$\Delta\rho_{i,t,Z}$=the density correction for depth correlated standoff for segment i at reference depth Z using the spine and rib algorithm;

$\rho_{i,Z}$=density corrected for depth correlated and time correlated standoff for segment i at reference depth Z; and $\rho_{b,Z}$=formation bulk density corrected for depth and time correlated standoff and comprising an azimuthal average of segments i over regions of constant azimuthal density.

Standoff Corrections

Figure 2:
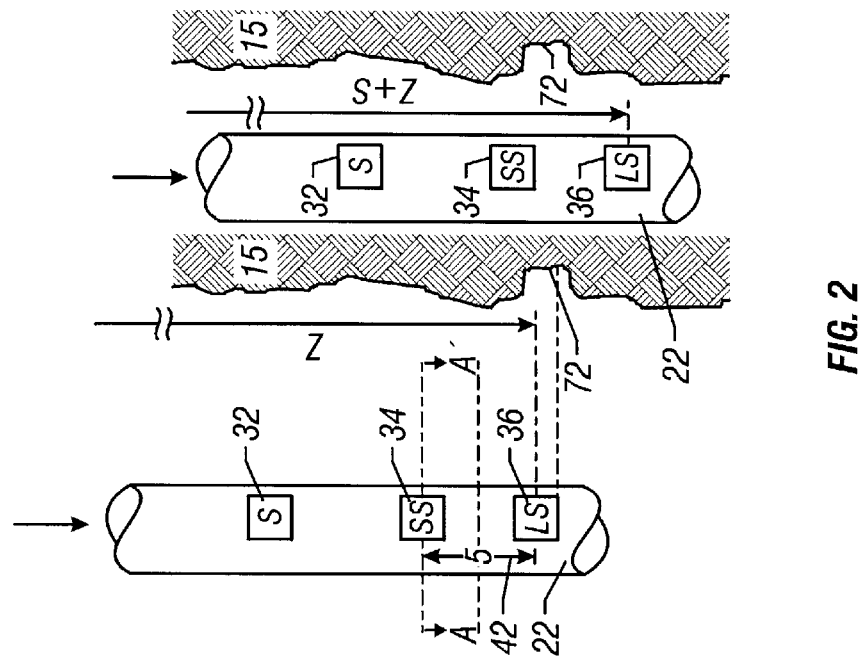
FIG. 2 illustrates depth-correlated standoff.

An example of depth correlated standoff is shown in FIG. 2, which conceptually illustrates a borehole irregularity 72, one which could be caused by motion of the drill bit that forms a "threaded" borehole. In a threaded borehole, a spiral groove is cut into the borehole by the motion of the bit. Since the two detectors 34 and 36 are axially aligned within the LWD density tool 22, the irregularity 72 causes one of the two detectors to respond to the groove first as that detector is conveyed past the groove. More specifically, the two locations in FIG. 2 show the LWD tool 22 at a depth Z (on the left) and Z+s along the borehole, where depth is arbitrarily measured with respect to the long spaced detector 36. It is within contemplation of the subject invention to select another reference depth point, such as the short spaced detector or the gamma ray source. When the long spaced detector 36 is opposite the irregularity 72, measurements are affected by standoff involving the irregularity. Since the short spaced detector has not yet reached the irregularity, it is therefore affected by a smaller standoff as illustrated in this portion of FIG. 2. Referring to the right hand portion of FIG. 2, the drill bit over time advances the borehole a distance 42 which represents the spacing shift between the two views where the short spaced detector 34 moves downward and aligns with the irregularity 72. The tool 22 is now at a depth Z+42, with the depth reference point being the depth of the long spaced detector 36. In the right hand portion of FIG. 2, the short spaced detector is now exposed to the greater standoff. The position and duration of the standoff measured at the depths Z and Z+42 will be the same for long and short spaced detectors, respectively, assuming equal spatial resolution for both detectors. Detector responses to the irregularity 72 will, of course, occur at different times. Using the nomenclature above. $C_{SS,i,d}$ and $C_{LS,i,d}$ are combined using the spine and rib algorithm to obtain $\rho_{i,d,Z}$ and $\Delta\rho_{i,d,Z}$.

Other methods can be used to correct for depth correlated standoff. It is within contemplation of this invention to utilize convolution and deconvolution techniques to both depth shift detector responses, and to also correct detector responses for differences in spatial resolution, if such differences exists. Shifted and deconvolved detector responses are then processed, using the previously referenced spine and rib technique or the like, and a value of corrected density as well as the magnitude of the correction are again obtained.

Figure 3:
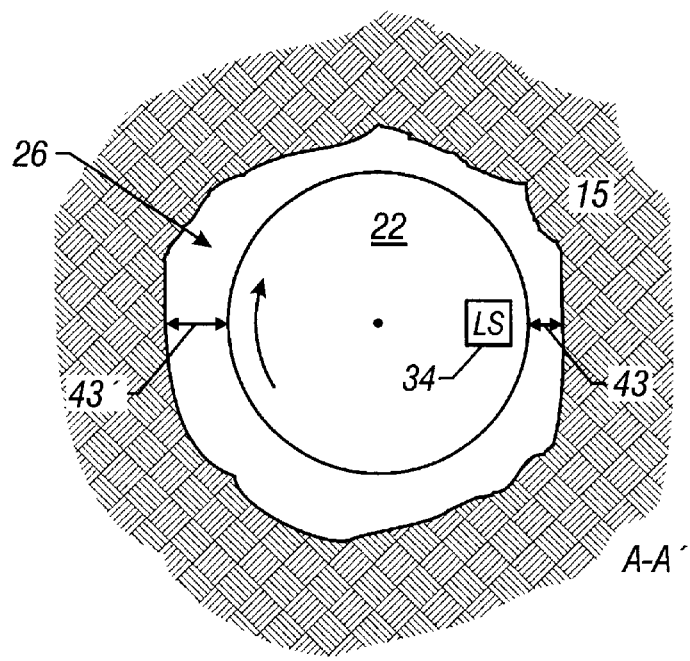
FIG. 3 illustrates tool and borehole geometry requiring time-correlated standoff.

Attention is next directed toward the definition of time correlated standoff and toward the correction for this source of error. Time correlated standoff results from varying radial motion within the borehole and is illustrated in FIG. 3. FIG. 3 is a cross sectional view at A–A' (see FIG. 2) of the tool 22, at the position of the short spaced detector 34, in the borehole 26. In this situation, both the long spaced and short spaced detectors move radially with respect to the borehole wall at the same time. Stated another way, both detectors "see" the same standoff at the same time and for the same time duration as the tool 22 moves radially toward and away from the borehole wall. For eccentered rotation as shown in FIG. 3, the detectors see a standoff 43 at one point of a revolution of the tool, and see a second standoff 43' as the detectors rotate to the opposite side of the borehole.

Figure 4:
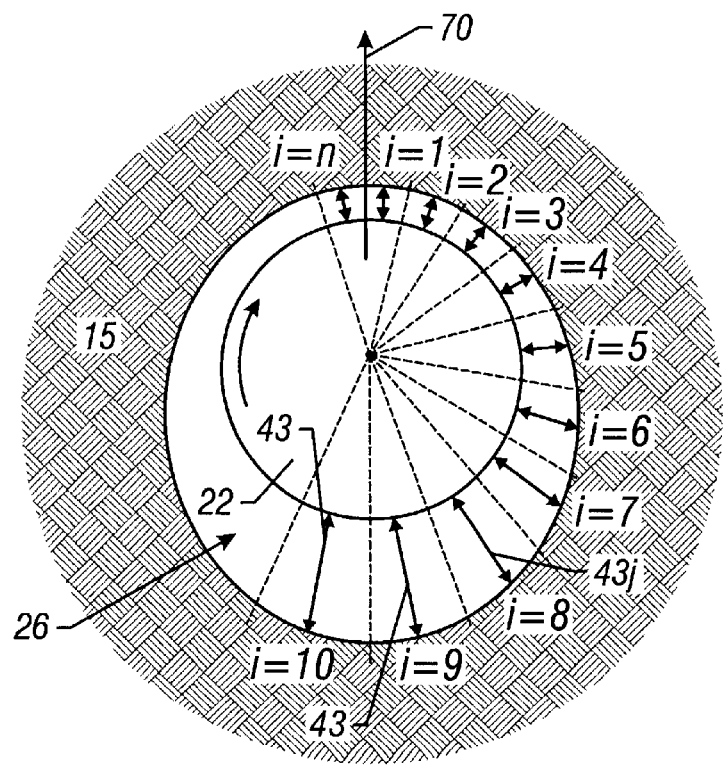
FIG. 4 shows azimuthal segmentation of the response of the LWD system used to correct for time related standoff.

As summarized previously, the basic methodology of this invention retains time related detector standoff information without mixing or depth averaging detector count rate over multiple tool rotations. FIG. 4 shows a sectional view of the tool 22 in the borehole 26, wherein detector sensitivity is indicated by the arrow 70 and the tool 22 is eccentric to the major axis of the borehole 26. Each tool rotation is divided into angular segments i identified by the numeral 43. The angular value of each segment is preferably a constant, and the segments are preferably contiguous. Segments are sufficiently small so that variations in the radial position within a given segment is assumed to be negligible. Count rates $C_{SS,i,t}$ and $C_{LS,i,t}$ are measured for each segment i (i=1,2, 3, . . . ,n). $C_{SS,i,t}$ and $C_{LS,i,t}$ are, of course, recorded during the same time interval and are therefore processed to correct for time correlated standoff. It should be noted that because of differing axial spacings, the long and short spaced detectors could be positioned in formations with differing densities. The spine and rib method is again used to combine $C_{SS,i,t}$ and $C_{LS,i,t}$ to obtain $\rho_{i,t,Z}$ and $\Delta\rho_{i,t,Z}$ for each segment i.

Data corrected for time based and depth based standoff are next combined to obtain $\rho_{i,Z}$, a density value corrected for depth correlated and time correlated standoff for segment i at reference depth Z. For the long spaced detector, the time based and depth based corrections, $\Delta\rho_{i,t,Z}$ and $\Delta\rho_{i,d,Z}$, are compared. The smaller of these two corrections is then added algebraically to the corresponding formation bulk density values, $\rho_{i,t,Z}$ or $\rho_{i,d,Z}$ computed for the long spaced detector, to obtain $\rho_{i,Z}$. Other methods involving a third correction term can be employed to combine time based and depth based corrections to obtain bulk density corrected for standoff. For example, a third correction term can be employed based upon a standoff error term associated with the short spaced detector response. This term is determined in a manner similar to that described above for obtaining error associated with long spaced detector standoff. Two time derived correction terms are then used to estimate standoff of each detector. This results in a standoff estimate to be used in computations using depth shifted detector count rate measurements. Two cases are then considered. For the first case, where the two standoff estimates are approximately equal, the depth based correction is used to obtain the desired corrected bulk density value for each segment since both detectors have approximately the same standoff. In the second case where the two standoff estimates differ, the depth based correction is adjusted as a function of the two standoff values and corrected bulk density is obtained from this adjusted depth based correction.

Depth shifting alone complicates the standoff compensation problem and may yield erroneous results when time correlated standoff and azimuthally varying formation densities are encountered. In many commercially available LWD density tools, the count rates recorded by each detector are averaged over a depth interval, typically about six inches. It is again noted that depth averaging suppresses information in the observed count rate related to time correlated errors. Simple depth averaging methods used in prior art systems make it essentially impossible to extract and process the time based component of standoff.

One-dimensional Log from Azimuthal Averaging

All measurements, computations and corrections at this point in the disclosure have been made for each individual azimuthal section i (i=1,2,3, . . . ,n) swept by LWD tool 22 as it rotates in the borehole 26. It is within contemplation of the subject invention to obtain these measurements during the following modes of operation: drilling, sliding, tripping, circulating, fishing, and short trips (up or down).

Figure 5:
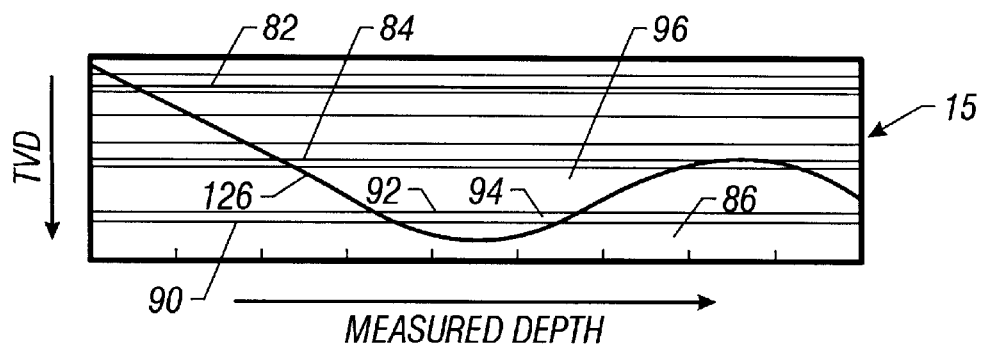
FIG. 5 shows a deviated well borehole penetrating multiple formations with bed boundaries not in a plane perpendicular to the major axis of the borehole.

The true formation density, $\rho_{i,Z}$, computed for each segment may not be the same for all segments due to formation layering, borehole trajectory, dipping formation beds, a deviated borehole, formation heterogeneity, or borehole shape. FIG. 5 is a sectional view of earth formations consisting of a series of laminated beds of material of varying bulk density. The value of the bulk density of each bed is represented by a "gray" scale, with beds of substantially constant density being denoted by the numerals 82, 84, 86, 90, 92, 94 and 96. The ordinate of the illustration represents true vertical depth (TVD) from the surface of the earth. A deviated well borehole 126 is shown penetrating all illustrated formation beds, and penetrating some beds (e.g. bed 96) as many as three times. The abscissa of the illustration is related to the measured depth along the borehole 126. All illustrated boundaries do not lie in a plane perpendicular to the major axis of the borehole 126.

Variation in true formation density around the periphery of a borehole presents a problem in defining a one-dimensional density value as a function of measured depth Z within the borehole. One prior art solution to the problem is to select only a small azimuthal segment i of borehole, measure the parameter of interest only in this segment, and present this segment measurement as a function of depth as a conventional one-dimensional log required by most interpretation software. For logging system measuring statistical processes, such as the gamma-gamma density measurement, the statistical precision of the measurement is severely degraded since response from a large azimuthal portion of the borehole at a given depth is not used in an azimuthal average. Conversely, accuracy of the measurement and bed thickness definition are lost if all segments of azimuthal data are averaged for a complete tool resolution since true density does vary around the borehole.

Figure 6A:
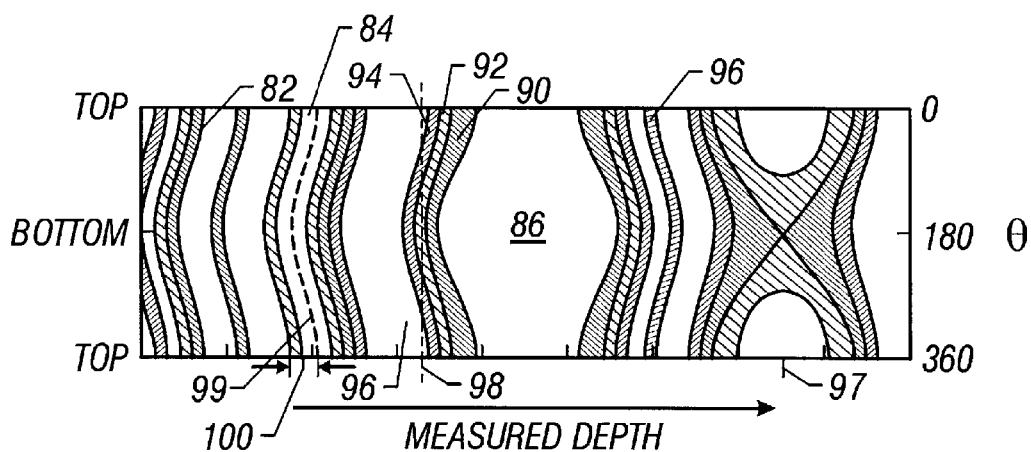
FIG. 6a depicts a two-dimensional map of densities of formations penetrated by the borehole and generated from azimuthal segment measurements.

Holenka et al, as previously referenced and incorporated herein by reference, discloses a LWD device which addresses the two-dimensional nature of formation density around the borehole penetrating bedded formations as shown in FIG. 5. Segmented rotational measurements within segments i (i=1,2,3, . . . ,n) combined with orthogonal depth measurements as the LWD tool is conveyed within the borehole provide means for generating a two-dimensional cylindrical map of the borehole density as shown in FIG. 6a. Density values have been corrected for time and depth correlated standoff using methods discussed above. The same gray scale as used in FIG. 5 represents beds of substantially constant density. The ordinate represents an angle θ around the periphery of the borehole with respect to a reference vector, and the abscissa represents measured depth along the well borehole 126 and is the same scale as shown in FIG. 5. FIG. 6a is, therefore, a two-dimensional map of density of the beds shown in FIG. 5 as penetrated by the borehole 126. Beds 82, 84, 86, 90, 92, 94 and 96 are shown in FIG. 6a and represent the same beds as shown in FIG. 5.

The problem of azimuthal averaging is illustrated in FIG. 6a. Beds 92, 94 and 96 are all penetrated at a measured depth Z indicated by the broken line 91. Stated another way, formations with three distinctly different bulk densities are found in a plane perpendicular to the major axis of the borehole at a reference depth Z identified as 91. A simple azimuthal average of segment density measurements at the depth 91 includes contributions from the bed 96, the bed 94 and the bed 92. This would obviously yield an inaccurate one-dimensional density measurement at this depth, and would also distort the thickness of the beds.

The present invention overcomes the azimuthal averaging problem by first creating a two-dimensional map of density, corrected for time and depth correlated standoff, as shown in FIG. 6a. Next, regions of constant density are defined using commercially available error minimization and edge detection techniques such as Image Primer 1.2 supplied by Rio Grande Software, Austin, Tex. Values of $\rho_{i,Z}$ (i=1,2,3, . . . ,n) are then averaged, but Z is varied so that all averaged $\rho_{i,Z}$ represent a single value of bulk density. This process is illustrated in FIG. 6a for the bed 84. Values of $\rho_{i,Z}$ measured along the broken line 99 are located and averaged from a range of values of Z in the band 100. This process is repeated for each bed and averaged density values are collapsed into a one-dimensional log as a function of a reference depth Z and an azimuthal reference vector. In some cases, several regions may be required, e.g. depth intervals straddling a formation bed boundary as illustrated at measured depth 97 in FIG. 6a.

It should also be noted that values of $\rho_{i,Z}$ can be combined by methods other than simple averaging. As an example, values of $\rho_{i,Z}$ can be weighted by factors of statistical significance, and the weighed values can be combined and collapsed into a one-dimensional log as a function of depth.

Figure 6B:
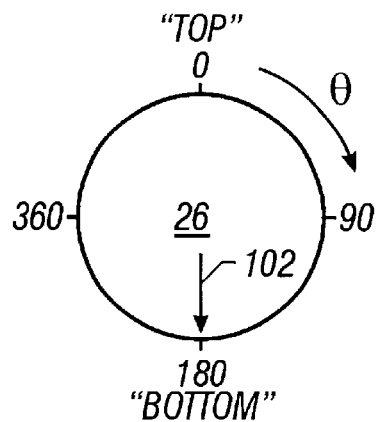
FIG. 6b illustrates an azimuthal reference vector used in collapsing the two-dimensional density map into a one-dimensional density log.
Figure 7:
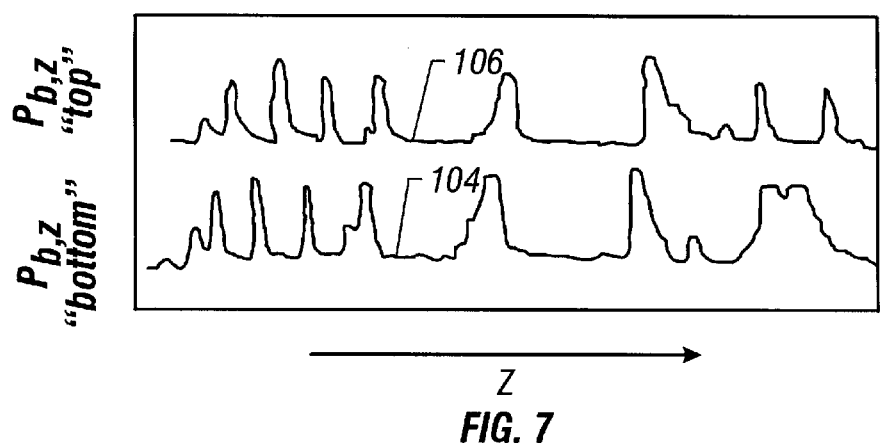
FIG. 7 shows dimensional density logs recorded as a function of measured depth in the borehole, where one log represents density measured as a function of depth with respect to the top of the borehole and the second curve represents density measured with respect to the bottom of the borehole.

While being able to select a region bounded by geological dip and collapsing azimuthal density measurements to one dimension, it is also essential to reference the resulting one-dimensional computed bulk density to a fixed borehole orientation or reference vector relative to the local gravity vector. This process is best seen in FIG. 6b which is a sectional view of the borehole 26. The angle θ is measured from a reference vector 102, and the two-dimensional density measurements are collapsed to a one-dimensional log in a measure reference depth defined by the reference vector 102. Examples of fixed borehole orientations are the bottom, the top, or the sides of the borehole. The reference vector 102 in FIG. 6b is shown oriented to the "bottom" of the borehole. Wireline density tools typically "fall" to the bottom or low side of the borehole resulting in a one-dimensional measurement characteristic of the low side of the borehole. To enable accurate comparison of wireline density logs and the LWD density log set forth in this disclosure, it is preferred to set the reference vector 102 at the low or "bottom" side of the borehole 26. Referring to FIG. 7, the subject invention yields a one-dimensional formation bulk density measurement $\rho_{b,Z}$ represented by a curve 104 plotted as a function on measured depth Z. The bulk density values are compensated for both time correlated and depth correlated standoff, and are referenced to a known borehole orientation vector that, in this example, is the bottom of the borehole. This differs significantly from previously discussed prior art which generates a one-dimensional log from either a simple average of azimuthal segments at a measured depth, or from the response of the tool in a single azimuthal segment. Since data from all segments i of constant density are azimuthally averaged, statistical precision of the measurement is maximized. The correct value of bulk density is obtained since formations of differing bulk density are not mixed, and bed boundary definition is preserved.

The basic concepts of the invention can be used with other LWD systems which measure properties of earth formation other than bulk density. Other systems include acoustic systems, electromagnetic systems and other types of nuclear systems such as natural gamma ray and neutron porosity systems. If the methodology of this invention is used with an electromagnetic LWD systems, such as resistivity devices with multiple depths of investigation, it may be desirable to generate two or more one-dimensional logs, with one referenced to the top of the borehole, a second referenced to the bottom of the borehole, and a third referenced possibly to the side of the borehole. Such information can be useful in borehole fluid invasion studies in deviated wells. The method is also applicable to any LWD system which requires sensor response correction for borehole and near borehole effects, and which is operated in formations where the bed boundaries are not in a plane parallel to the major axis of the borehole. The method is also applicable in deviated boreholes which penetrate homogeneous, non-bedded formations. In these situations, borehole fluid invasion into the formation will typically decrease at the top of the borehole and increase at the bottom of the borehole due to the effects of gravity. Tool response to shallow, medium and deep resistivity devices will vary azimuthally, even in regular or uniform density layers. This azimuthal variation requires the same type of processing described in detail for the LWD density system. Means other than averaging can be used to combine segments of substantially constant value such as weighting segments as a function of signal strength.

An example of a second one-dimensional log generated from two-dimensional image data is illustrated in FIG. 7 as a second bulk density curve $\rho_{b,Z}$ referenced to the top of the borehole and identified by the numeral 106.

Methods of the invention are not limited to LWD logging systems using two downhole sensors. More than two sensors can be used, and a single sensor can also be used although the depth correlated standoff correction would not be necessary. Furthermore, methods of this invention are not limited to systems with sensors requiring standoff corrections. For such systems, a two-dimensional map of the desired formation property is generated from segment sensor responses. Regions of constant formation property are identified from the two-dimensional map and the map is collapsed into a one-dimensional log by again azimuthally combining segment values over regions of constant formation property.

Summary of Data Processing

Figure 8:
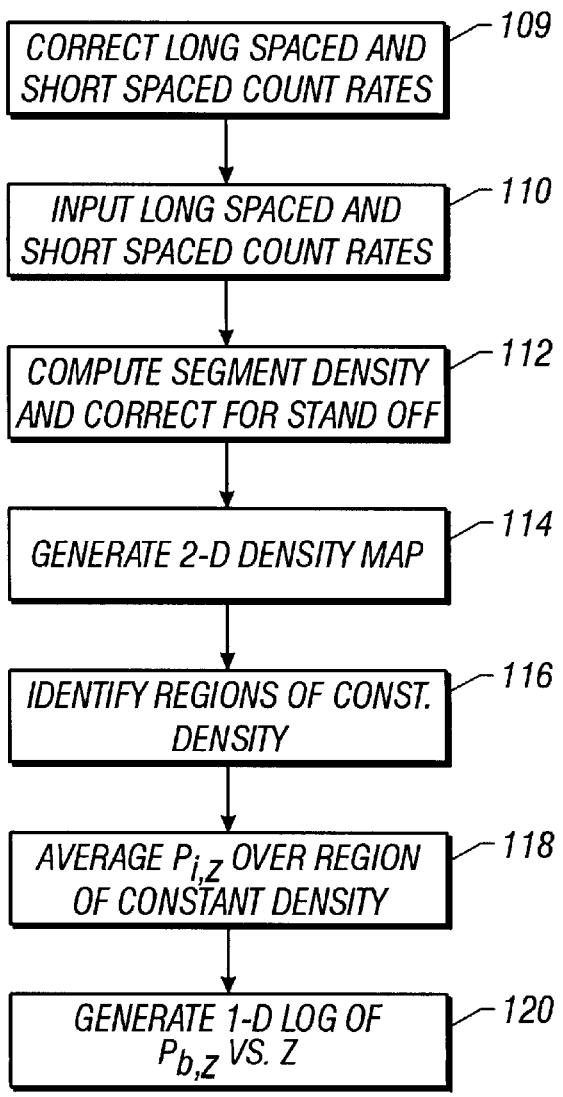
FIG. 8 is a flow chart illustrating major data processing steps.

The preferred processing of measured count rates from the long and short detectors is summarized in the flow chart of FIG. 8. Any preprocessing corrections of the measured long spaced and short spaced count rates are made at step 109. Such corrections can include dead time corrections for the short spaced detector and the long spaced detector. Long spaced and short spaced detector count rates are input at step 110. It should be understood that density values for each azimuthal segment i are computed and corrected for depth correlated standoff and time correlated standoff at step 112 thereby yielding values of $\rho_{i,Z}$. A two-dimensional map of density, corrected for standoff, is generated from segment density values $\rho_{i,Z}$ at step 114. Regions of constant density are identified at step 116. Segment density values $\rho_{i,Z}$ of constant density are averaged at step 118. Averaged density values are collapsed into a one-dimensional log of bulk density $\rho_{i,Z}$, referenced to an azimuthal vector, at step 120.

While the foregoing is directed to the preferred embodiment of the invention, the scope thereof is determined by the claims which follow.

What is claimed is:

1. A method for a determining a property of earth formation penetrated by a borehole, the method comprising:
   (a) conveying at least one sensor within said borehole, wherein said sensor is either rotating or stationary within said borehole;
   (b) measuring a responses of said sensor in a plurality of azimuthal borehole segments;
   (c) determining, for each said segment, a segment formation property from said sensor response within that segment;
   (d) forming a two-dimensional image of formation property from a plurality of said segment formation properties; and
   (e) using said image to identify segment formation properties of substantially constant value and combining these segments to form a one-dimensional log of said formation property with respect to an azimuthal reference vector.

2. The method of claim 1 comprising the additional steps of:
   (a) correcting each said segment formation property for sensor borehole effects thereby forming said corrected segment formation property for each said segment;
   (b) forming said image from a plurality of said corrected segment formation properties; and
   (c) combining corrected segment formation properties of substantially constant value to form said one-dimensional log.

3. The method of claim 2 comprising the additional steps of:
   (a) conveying and rotating at least two sensors within said borehole; and
   (b) correcting said segment formation properties for borehole effects comprising time correlated standoff and for depth correlated standoff.

4. The method of claim 3 comprising the additional steps of:
   (a) providing gamma ray detectors as sensors;
   (b) axially spacing said detectors from a source of nuclear radiation at different distances; and
   (c) wherein said corrected formation property is bulk density.

5. The method of claim 4 comprising the additional steps of:
   (a) mounting said detectors and said source within the wall of a drill collar within a drill string;
   (b) rotating said detectors within said borehole by rotating said drill string; and
   (c) conveying said detectors along said borehole while advancing said borehole by the action of a drill bit attached to said drill string.

6. The method of claim 1 including the additional step of forming two or more one-dimensional logs of said formation property wherein each one-dimensional log is referenced to a different azimuthal reference vector.

7. The method of claim 2 comprising the additional steps of:
   (a) conveying and rotating a plurality of sensors within said borehole, wherein the axial spacing of each sensor differs; and
   (b) correcting said segment formation properties for borehole effects comprising time correlated standoff and for depth correlated standoff.

8. A method for a determining density of earth formation penetrated by a borehole while drilling said borehole, the method comprising:
   (a) rotating and conveying a tool in said borehole on a drill string, wherein said tool comprises a source of nuclear radiation and a long spaced detector and a short spaced detector axially spaced at different distances from said source;
   (b) generating a long spaced detector response and a short spaced detector response in a plurality of azimuthal borehole segments wherein each response is indicative of nuclear radiation from said source interacting with said earth formation;
   (c) determining, for each said segment, a segment formation density by combining said long spaced detector responses and said short spaced detector responses within that segment;
   (d) correcting each said segment formation density for tool standoff thereby forming a plurality of corrected segment formation density values;
   (e) forming a two-dimensional image from formation density from said plurality of corrected segment formation density values, wherein said image encompasses the full periphery of said borehole; and
   (f) azimuthally averaging corrected segment densities of substantially constant value determined from said image to form a first one-dimensional log of said formation density with respect to an azimuthal reference vector.

9. The method of claim 8 comprising the additional steps of:
(a) correcting each said segment formation density for time correlated standoff; and
(b) correcting each said determined formation density for each segment for depth correlated standoff.

10. The method of claim 9 wherein said time correlated standoff is made using a spine and rib correction method.

11. The method of claim 9 wherein said depth correlated standoff correction is made by depth shifting said long spaced detector response and said short spaced detector point to a reference measure point on said tool.

12. The method of claim 8 wherein said azimuthal reference vector is aligned with a low side of said borehole.

13. The method of claim 8 including the additional steps of forming two or more one-dimensional logs and referencing each said log to a different azimuthal reference vector.

14. The method of claim 8 including the additional step of performing all computations required to obtain said formation density log using computer means within said tool.

15. The method of claim 14 including the additional step of telemetering said formation density log to the surface of the earth.

16. The method of claim 14 including the additional step of storing said formation density log in a storage means within said tool, and subsequently retrieving said log when said tool is returned to the surface of the earth.

17. The method of claim 8 wherein each said segment is equal in angle.

18. The method of claim 8 wherein all said segments are contiguous and encompass the entire periphery of said borehole.

19. The method of claim 8 wherein said source comprises an isotopic gamma ray emitting material.

20. The method of claim 8 wherein said long and short spaced detectors each comprises a scintillation crystal optically coupled to a photomultiplier tube.

21. The method of claim 8 wherein said at least the first one-dimensional log of said formation density comprises said azimuthally averaged regions of constant corrected density plotted as a function of measured depth of said tool within said borehole.

22. A system for determining a property of earth formation penetrated by a borehole comprising:
(a) a borehole tool comprising at least one sensor wherein said tool is conveyed and rotated within said borehole; and
(b) a computer for combining responses of said at least one sensor in a plurality of azimuthal borehole segments to obtain a measure of said property so that:
(i) a segment formation property is determined, for each said segment, from said sensor response within that segment,
(ii) a two-dimensional image is formed from said segment formation property determined in a plurality of segments, and
(iii) segment formation properties of substantially constant value are identified from said image and combining to form a one-dimensional log of said formation property with respect to an azimuthal reference vector.

23. The system of claim 22 wherein:
(a) each said segment formation property is corrected for borehole effects with a borehole correction thereby forming corrected segment formation property for each said segment;
(b) said two-dimensional image is formed from a plurality of said corrected segment formation properties; and
(c) corrected segment formation properties of substantially constant value are identified from said image and combined to form a one-dimensional log of corrected formation property with respect to said reference vector.

24. The system of claim 23 comprising two sensors and wherein said borehole correction comprises a time correlated standoff correction and a depth correlated standoff correction.

25. The system of claim 24 further comprising:
(a) gamma ray detectors as said sensors; and
(b) a source of nuclear radiation, so that:
(i) said detectors are axially spaced from said source at different distances, and
(ii) said corrected formation property is bulk density.

26. The system of claim 25 wherein;
(a) said tool comprises a drill collar;
(b) said detectors and said source are mounted within the wall of said drill collar and within a drill string;
(c) said tool is rotated within said borehole by rotating a drill string; and
(d) said tool is conveyed along said borehole while advancing said borehole by the action of a drill bit attached to said drill string.

27. The system of claim 22 wherein two or more one-dimensional logs of said formation property are formed, wherein each one-dimensional log is referenced to a different azimuthal reference vector.

28. A system for a determining density of earth formation penetrated by a borehole while drilling said borehole, the method comprising:
(a) a tool mounted in a collar in a drill string, wherein said tool comprises a source of nuclear radiation and a long spaced detector and a short spaced detector axially spaced at different distances from said source and is rotating and conveying in said borehole by said drill string;
(b) said long spaced detector and short spaced detector forming a response in a plurality of azimuthal borehole segments wherein each response is indicative of nuclear radiation from said source interacting with said earth formation defined by said segment;
(c) a computer connected to said long and short spaced detectors for determining, for each said segment, said formation density by combining said long spaced detector responses and said short spaced detector responses within that segment wherein each said determined formation density for each segment is corrected for tool standoff thereby forming a plurality of corrected density values for each segment; and
(d) said computer forms a two-dimensional image of corrected formation density from said plurality of corrected density values and azimuthally averaging regions of constant corrected density determined from said image to form at least one one-dimensional log of said formation density with respect to an azimuthal reference vector.

29. The system of claim 28 wherein said computer corrects for tool standoff and comprises:
(a) means for correcting each said determined formation density for time correlated standoff; and (b) means for correcting each said determined formation density for each segment for depth correlated standoff.

30. The system of claim 29 wherein said computer connects with a memory storing a spine and rib process instructions.

31. The system of claim 29 wherein said depth correlated standoff correction is made by depth shifting said long spaced detector response and said short spaced detector point to a reference measure point on said tool.

32. The system of claim 28 wherein said azimuthal reference vector is aligned with a low side of said borehole.

33. The system of claim 28 whereby two or more one-dimensional logs are formed and each said log is referenced to a different azimuthal reference vector.

34. The system of claim 28 further comprising a computer mounted within said tool and with which all computations required to obtain said formation density log are performed.

35. The system of claim 34 further comprising means for telemetering said formation density log to the surface of the earth.

36. The system of claim 34 further comprising a memory mounted within said tool and in which said formation density log is stored and subsequently retrieved when said tool is returned to the surface of the earth.

37. The system of claim 28 wherein each said segment is equal in angle.

38. The system of claim 28 wherein all said segments are contiguous and encompass the entire periphery of said borehole.

39. The system of claim 28 wherein said source comprises an isotopic gamma ray emitting material.

40. The system of claim 28 wherein said long and short spaced detectors each comprises a scintillation crystals optically coupled to a photomultiplier tube.

41. The system of claim 28 wherein said at least one-dimensional log of said formation density comprising said azimuthally averaged regions of constant corrected density is plotted as a function of measured depth of said tool within said borehole.

* * * * *